United States Patent
Ou et al.

(10) Patent No.: US 10,756,618 B2
(45) Date of Patent: Aug. 25, 2020

(54) REGULATOR DEVICE AND CONTROL METHOD THEREOF

(71) Applicant: Realtek Semiconductor Corporation, Hsinchu (TW)

(72) Inventors: Wei-Wen Ou, Hsinchu County (TW); Shih-Chieh Chen, Yilan (TW); Chien-Sheng Chen, Zhubei (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 16/455,907

(22) Filed: Jun. 28, 2019

(65) Prior Publication Data

US 2020/0136499 A1    Apr. 30, 2020

(30) Foreign Application Priority Data

Oct. 26, 2018 (TW) .............................. 107138055 A (51) Int. Cl.
*H02M 1/32* (2007.01)
*H02M 3/157* (2006.01)
*H02M 1/08* (2006.01)
*H02M 3/158* (2006.01)

(52) U.S. Cl.
CPC ................ *H02M 1/32* (2013.01); *H02M 1/08* (2013.01); *H02M 3/157* (2013.01); *H02M 3/158* (2013.01)

(58) Field of Classification Search
CPC ............ H02M 1/32; H02M 1/38; H02M 1/08; H02M 3/157; H02M 3/158
See application file for complete search history.

(56) References Cited

U.S. PATENT DOCUMENTS

| | | | | |
|---|---|---|---|---|
| 9,935,553 | B2* | 4/2018 | Svorc ................... | H02M 3/1588 |
| 2005/0116697 | A1* | 6/2005 | Matsuo ............... | H02M 3/1584 |
| | | | | 323/282 |
| 2005/0200384 | A1 | 9/2005 | Nadd | |
| 2005/0258808 | A1* | 11/2005 | Chen .................... | H02H 7/1213 |
| | | | | 323/222 |
| 2007/0120548 | A1* | 5/2007 | Kojima ............... | H02M 3/1588 |
| | | | | 323/284 |
| 2016/0380539 | A1* | 12/2016 | Fukumoto ........... | H02M 3/1588 |
| | | | | 323/271 |
| 2017/0237350 | A1* | 8/2017 | Kawano .................. | H02M 1/32 |
| | | | | 323/271 |
| 2018/0219483 | A1* | 8/2018 | Hsiao ..................... | H02M 3/158 |
| 2018/0375320 | A1* | 12/2018 | Ho ......................... | H02H 3/202 |
| 2019/0068046 | A1* | 2/2019 | Xue ........................ | H02M 1/08 |

* cited by examiner

*Primary Examiner* — Kyle J Moody
*Assistant Examiner* — Jye-June Lee
(74) *Attorney, Agent, or Firm* — Locke Lord LLP; Tim Tingkang Xia, Esq.

(57) ABSTRACT

A regulator device includes a first switch, a second switch, a protecting circuit, and a driving circuit. The first switch is configured to receive power supply voltage. One terminal of the second switch and the first switch are coupled at a node. The other terminal of the second switch is coupled to ground. The protecting circuit is coupled to the node, and outputs at least one protecting signal according to the turn on/off state of the first switch and the second switch and the voltage of the node. The driving circuit is coupled to the first switch, the second switch, and the protecting circuit, and turns off the first switch or the second switch according the at least one protecting signal.

16 Claims, 5 Drawing Sheets

REGULATOR DEVICE AND CONTROL METHOD THEREOF

CROSS-REFERENCE TO RELATED APPLICATION

This application claims priority to Taiwan Application Serial Number 107138055, filed on Oct. 26, 2018, which is herein incorporated by reference.

BACKGROUND

Field of Invention

The disclosure relates to a voltage converting apparatus and a control method thereof. More particularly, the disclosure relates to a regulator device and a control method thereof.

Description of Related Art

To prevent the regulator from being damaged, detecting elements may be configured nearby the switches of the regulator in general case. The detecting elements determine the state of the switches, and feedback signals to the protection device. After that, the protection device transmits signals to the driving device, and the switches can be turned off accordingly to prevent from being damaged.

However, the protecting method stated above needs additional detecting elements configured nearby the switches, which results in increasing the cost and the area of the regulator. Further, the regulator which has additional detecting elements needs multiple elements to process/determine the signal, and transmit the signal to the next element. Hence, not only the complexity is increased, but also the processing time is increased, which results in lowering the overall operating speed. Therefore, how to design the protecting device for the regulator to prevent the increasing cost and the area of the regulator, and increasing the overall operating speed, are the important problem and the objective to improve in the related technical field.

SUMMARY

An aspect of the present disclosure is to provide a regulator device including a first switch, a second switch, a protecting circuit, and a driving circuit. The first switch is configured to receive a power supply voltage. One terminal of the second switch and the first switch are coupled at a node, and another terminal of the second switch is coupled to a ground terminal. The protecting circuit is coupled to the node, and is configured to output at least one protecting signal according to a turn on/off state of the first switch and the second switch and a voltage of the node. The driving circuit is coupled to the first switch, the second switch, and the protecting circuit, and is configured to turn off the first switch or the second switch according to the at least one protecting signal.

Another aspect of the present disclosures is to provide a control method of controlling a regulator device. The regulator device comprises a first switch and a second switch. One terminal of the first switch is configured to receive a power supply voltage, one terminal of the second switch and the first switch are coupled at a node, and another terminal of the second switch is coupled to a ground terminal. The control method comprises: outputting at least one protecting signal according to a turn on/off state of the first switch and the second switch and a voltage of the node; and turning off the first switch or the second switch according to the at least one protecting signal.

Therefore, according to the present disclosure, the regulator device and the control method do not need the additional detecting elements, hence the cost and the area of the regulator device can be reduced and because of the reduction of the detecting elements. In addition, the regulator device and the control method make the switches turn off quickly in response to the regulator device satisfying conditions, such that the overall operating speed is increased.

It is to be understood that both the foregoing general description and the following detailed description are by examples, and are intended to provide further explanation of the invention as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

Figure 1:
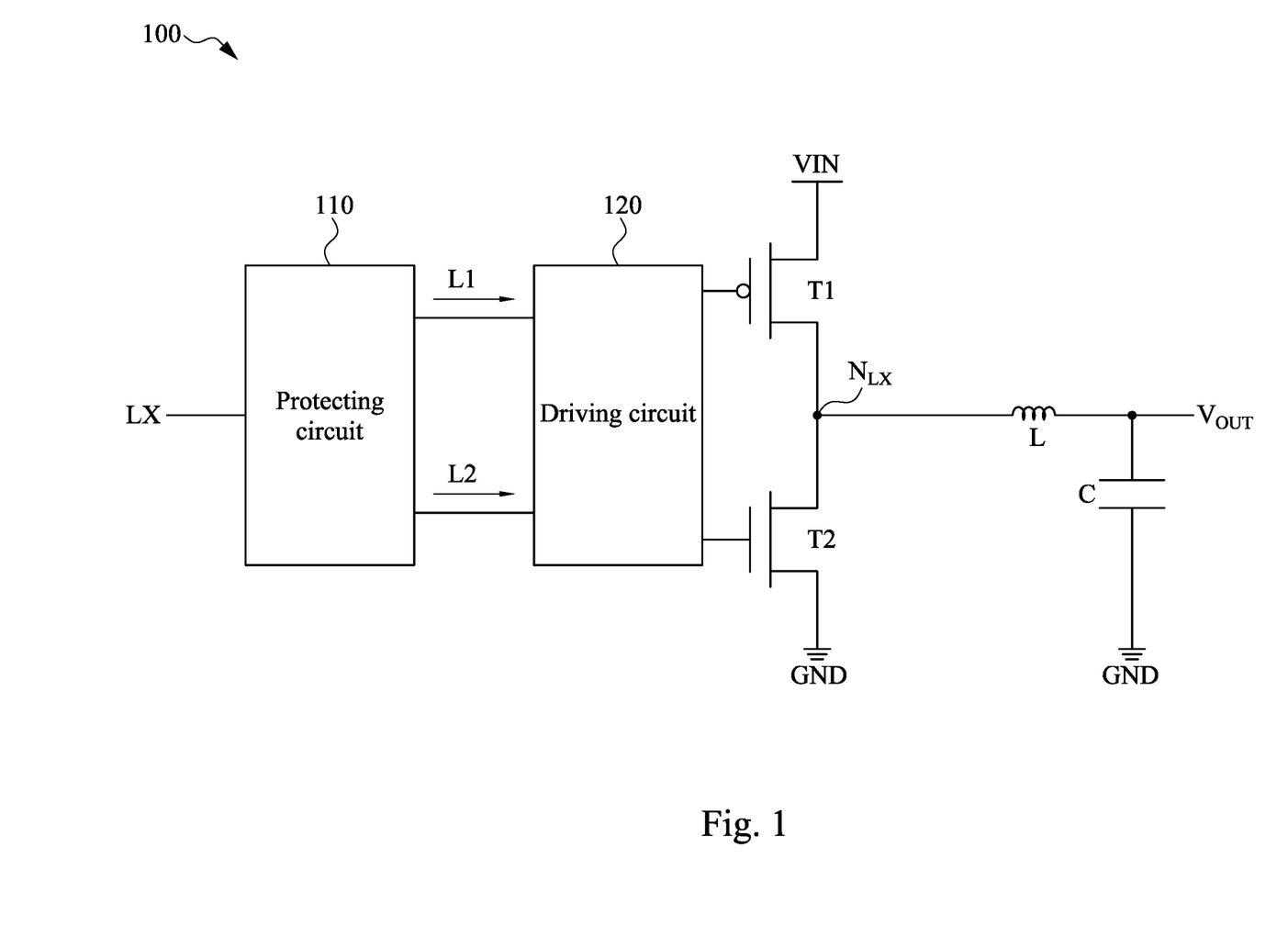
FIG. 1 is a schematic diagram illustrating a regulator device according to some embodiments of the present disclosure.

FIG. 1 is a schematic diagram illustrating a regulator device 100 according to some embodiments of the present disclosure. As shown in FIG. 1, the regulator device 100 comprises a first switch T1, a second switch T2, a protecting circuit 110, and a driving circuit 120. About the structures of the regulator device 100, the first switch T1 is configured to receive a power supply voltage VIN. One terminal of the second switch T2 and the first switch T1 are coupled at the node $N_{LX}$, and the other terminal of the second switch T2 is coupled to a round terminal GND. The protecting circuit 110 is coupled to the node $N_{LX}$ and configured to receive a voltage LX of the node $N_{LX}$. The driving circuit 120 is coupled to the first switch T1, the second switch T2, and the protecting circuit 110.

In one embodiment, the protecting circuit 110 is configured to output at least one protecting signal according to a turn on/off state of the first switch T1 and the second switch T2 and the voltage LX of the node $N_{LX}$. The driving circuit 120 is configured to turn off the first switch T1 or the second switch T2 according to the at least one protecting signals.

For example, when the first switch T1 is in the turn on state and the voltage LX of the node $N_{LX}$ is at a low level, the protecting circuit 110 outputs a first protecting signal L1 to the driving circuit 120, and the driving circuit 120 turns off the first switch T1 according to the first protecting signal L1.

When the second switch T2 is in the turn on state and the voltage LX of the node $N_{LX}$ is in a high level, the protecting circuit 110 outputs a second protecting signal L2 to the driving circuit 120, and the driving circuit 120 turns off the second switch T2 according to the second protecting signal L2. The present disclosure provides the above circuit configurations and control method such that additional detection elements are not required to set nearby the switches. Therefore, the detection element can be eliminated, the cost can be reduced, and the area of the regulator device can be smaller in the present disclosure.

In addition, if the additional element is set nearby the switches, the operations will be complicated, and the overall speed will be reduced. For example, the state of the switches need to be detected by the detection element at first, then a detecting signal is transmitted to the protecting circuit, and the protecting circuit transmits the protecting signal to the driving circuit such that the switches can be turned off. Comparing above statements with the circuit configurations and the control method of the present disclosure, the regulator device 100 turns off the switches quickly after satisfying the conditions said above. Therefore, the overall speed for operating can be increased.

In some embodiment, the regulator device 100 can be but not limited to the Buck switching regulator.

Figure 2:
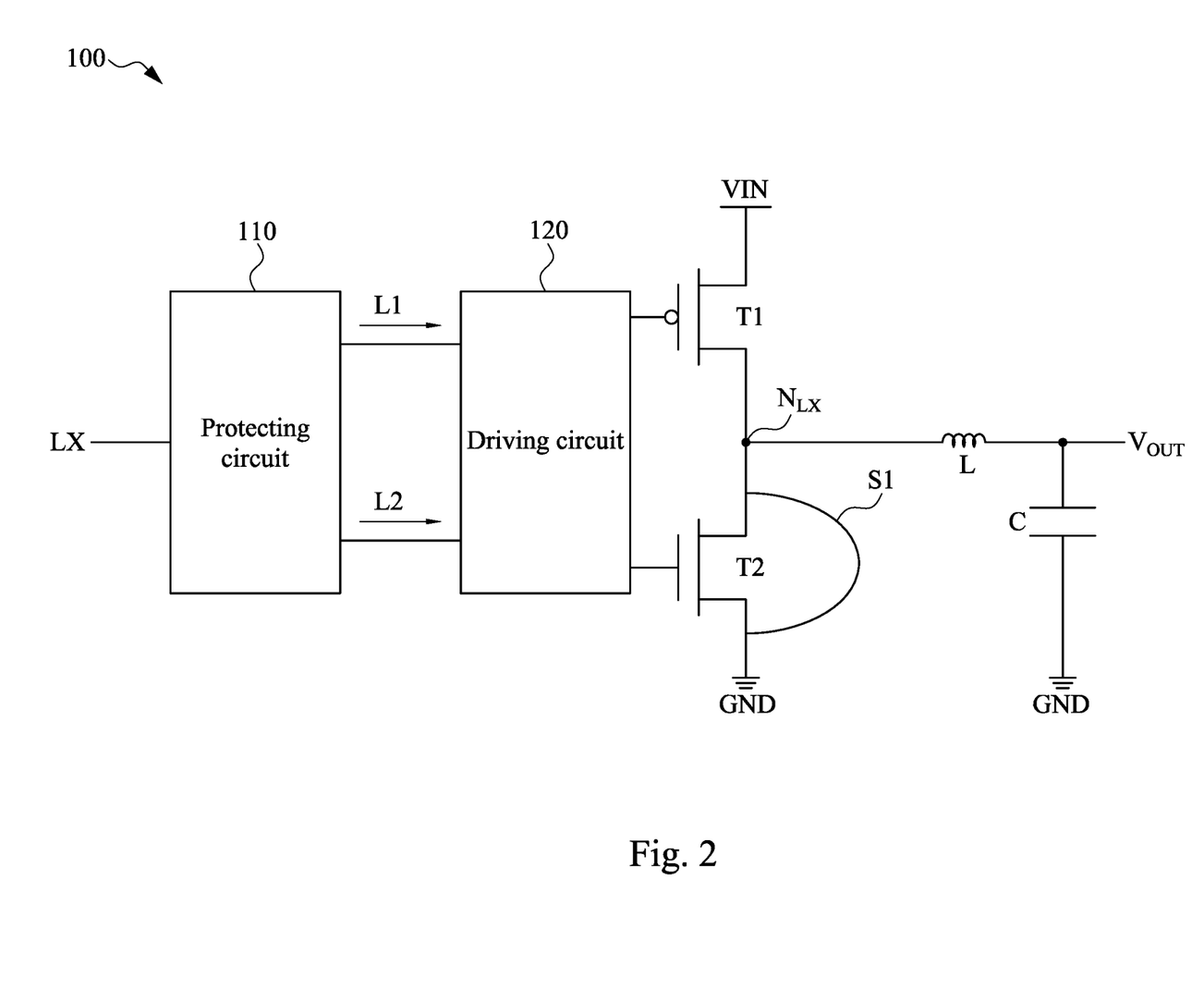
FIG. 2 is a schematic diagram illustrating the operation of the regulator device of FIG. 1 according to some embodiments of the present disclosure.

FIG. 2 is a schematic diagram illustrating the operation of the regulator device 100 of FIG. 1 according to some embodiments of the present disclosure. What should be noted is that, the state of the first switch T1 of FIG. 2 is in the turn on state, and the state of the second switch T2 is shorted. Generally, only one switch will be turned on, for example, the first switch T1 is in the turn on state, and the second switch T2 is in the turn off state. Therefore, the power supply voltage can be transmitted by the first switch T1 based on transmitting the voltage to the node $N_{LX}$, such that the voltage LX of the node $N_{LX}$ is increased and the output terminal $V_{OUT}$ outputs the required voltage.

However, in the state shown in FIG. 2, the second switch T2 is in a shorted state, and the shorted path S1 exists, such that the voltage LX of the node $N_{LX}$ will be decreased and lead the voltage LX of the node $N_{LX}$ to the low level. In the control method of the present disclosure, the voltage LX of the node $N_{LX}$ is retrieved by the protecting circuit 110 directly. When the first switch T1 is in the turn on state, and the voltage LX of the node $N_{LX}$ is at the low level based on some determinations, the first protecting signal L1 is transmitted immediately to the driving circuit 120 in order to turn off the first switch T1 quickly.

In some embodiments, because the switching time between the first switch T1 and the second switch T2 of the regulator device 100 is extremely short, there may be the situation that the voltage LX of the node $N_{LX}$ is at the low level and the first switch T1 is just in the turn on state on some occasions. However, the second switch T2 is not shorted at this time. If the procedure now applies the foresaid conditions to execute operation in the present disclosure, the first switch T1 may be turned off in the wrong way. To avoid the foresaid wrong way, in the present disclosure, the voltage LX of the node $N_{LX}$ is set at the low level and has been maintained for a delay time to ensure that the second switch T2 is shorted, and then the protecting circuit 110 outputs the first protecting signal L1 to the driving circuit 120 accordingly.

Figure 3:
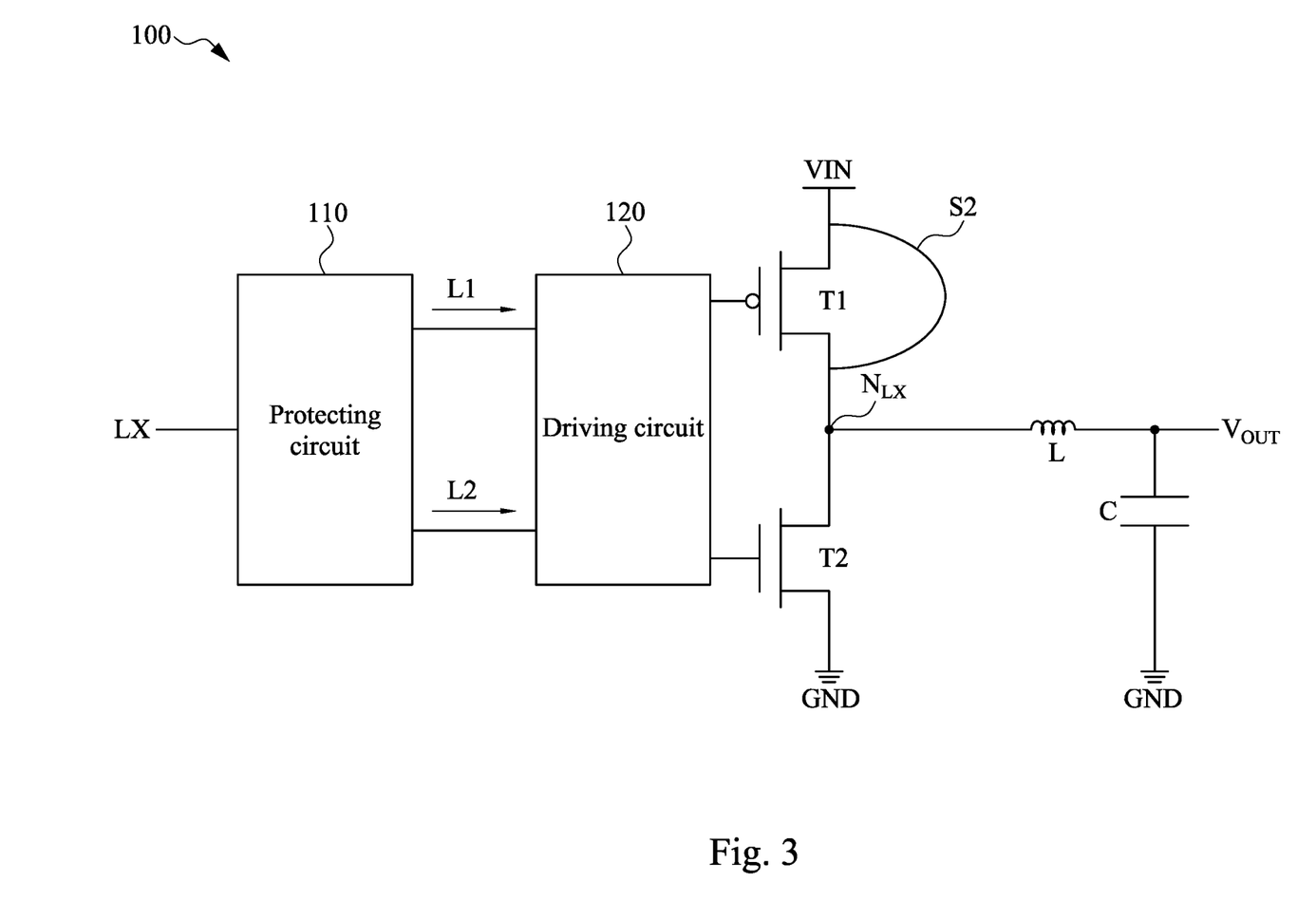
FIG. 3 is a schematic diagram illustrating the operating of the regulator device of FIG. 1 according to some embodiments of the present disclosure.

FIG. 3 is a schematic diagram illustrating the operating of the regulator device 100 of FIG. 1 according to some embodiments of the present disclosure. What should be noted is that, the state of the second switch T2 of FIG. 3 is in the turn on stat, and the first switch T1 is shorted. Generally, only one switch is turned on, for example, the second switch T2 is turned on, and the first switch T1 is turned off. Therefore, the output terminal VOUT outputs the required voltage by which the voltage LX of the node NLX is decreased by the second switch T2 using the power supply voltage.

However, in the state of FIG. 3, the first switch T1 is in shorted, and the shorted path S2 exists, such that the power supply voltage VIN transmits the voltage to the node $N_{LX}$ through the first switch T1, causing the voltage LX of the node $N_{LX}$ to be increased and leading the voltage LX of the node $N_{LX}$ to the high level. The present disclosure retrieves the voltage LX of the node $N_{LX}$ by the protecting circuit 110 directly. When the second switch T2 is in the turn on state and the voltage LX of the node $N_{LX}$ is at the high level based on some determinations, the second protecting signal L2 is transmitted immediately to the driving circuit 120 in order to turn off the second switch T2 quickly.

In some embodiments, because the switching time between the first switch T1 and the second switch T2 of the regulator device 100 is extremely short, there may be the situation that the voltage LX of the node $N_{LX}$ is at the high level and the second switch T2 is just in the turn on state on some occasions. However, the first switch T1 is not shorted at this time. If the procedure now applies the foresaid conditions to execute operation in the present disclosure, the second switch T2 may be turned off in the wrong way. To avoid the foresaid wrong way, in the present disclosure, the voltage LX of the node $N_{LX}$ is set at the high level and has been maintained for the delay time to ensure that the first switch T1 is shorted, and then the protecting circuit 110 outputs the second protecting signal L2 to the driving circuit 120 accordingly.

In the other embodiments, the first switch T1 and the second switch T2 both have a first terminal, a control terminal, and a second terminal respectively. The first terminal of the first switch T1 is configured to receive the power supply voltage VIN. The control terminal of the first switch T1 is coupled to the driving circuit 120. The first terminal of the second switch T2 and the first switch T1 are coupled at the node $N_{LX}$. The control terminal of the second switch T2 is coupled to the driving circuit 120. The second terminal of the second switch T2 is coupled to a ground terminal GND.

In the other embodiments, the regulator device 100 further comprises an inductance L and a capacitance C. The inductance L and the capacitance C both have a first terminal and a second terminal respectively. The first terminal of the inductance L is coupled to the node $N_{LX}$. The first terminal of the capacitance C is coupled to the second terminal of the inductance L. The second terminal of the capacitance C is coupled to the ground terminal GND.

Figure 4:
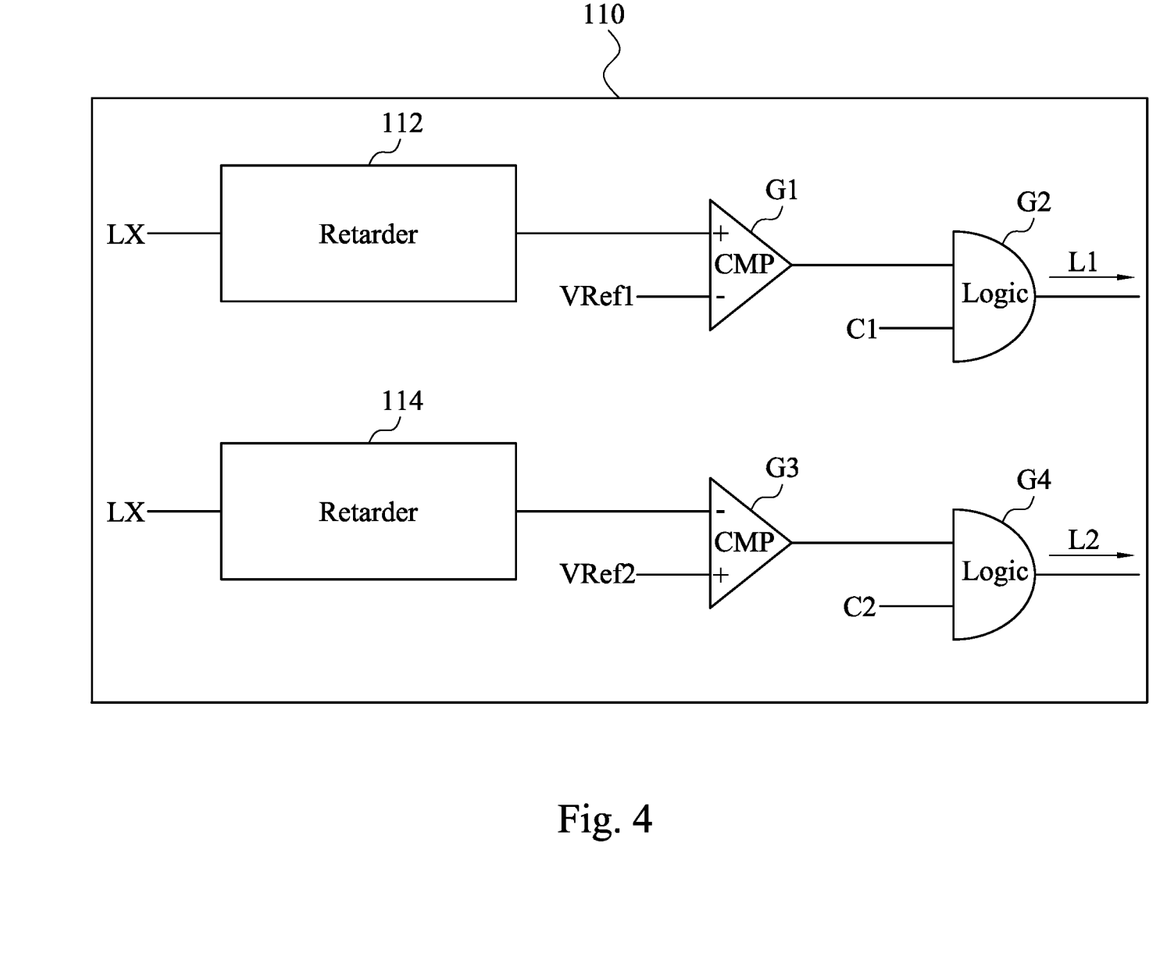
FIG. 4 is a schematic diagram illustrating the operation of a protecting circuit of the regulator device of FIG. 1 according to some embodiments of the present disclosure.

FIG. 4 is a schematic diagram illustrating the operations of a protecting circuit 110 of the regulator device 100 of FIG. 1 according to some embodiments of the present disclosure. As shown in FIG. 4, the protecting circuit 110 comprises a first comparator G1 and a first logic gate G2. The first comparator G1 is configured to receive the voltage LX of the node $N_{LX}$ and a first reference voltage VRef1, and outputs a first logic signal accordingly. The first logic gate G2 is configured to receive the first logic signal and a first control signal C1 of the first switch T1, and output the first protecting signal L1 to the driving circuit 120 accordingly.

For example, the first comparator G1 and the first logic gate G2 are configured to control logic circuits of the first switch T1. For preventing the state of FIG. 2 (such as the shorted state of the second switch T2) from damaging the first switch T1, the first reference voltage VRef1 is set at the low level. When the voltage LX of the node $N_{LX}$ is less than the reference voltage which is at the low level, the first logic signal outputted by the first comparator G1 is at the low level.

In the embodiment, the first switch T1 can be but not limited to the P-type Metal-Oxide-Semiconductor Field-Effect Transistor (MOSFET). In this case, the first control signal C1 of the first switch T1 is at the low level and to turn on the first switch T1. In case the second switch T2 is shorted, the first logic gate G2 outputs the first protecting signal L1 which is at the low level to the driving circuit 120 according to the first logic signal which is at the low level and the first control signal C1 which is the low level. When the driving circuit 120 receives the first protecting signal L1 which is at the low level, the driving circuit 120 will turn off the first switch T1.

Please refer to FIG. 4. The protecting circuit 110 further comprises a first retarder 112. The first retarder 112 is coupled to the first comparator G1, and configured to receive the voltage LX of the node $N_{LX}$ and to provide the voltage LX of the node $N_{LX}$ to the first comparator G1. It should be noted that, the function of the first retarder 112 is described above and is configured to prevent from mistaken movement, and the tautology is eliminated herein.

Further, the protecting circuit 110 further comprises a second comparator G3 and a second logic gate G4. The second comparator G3 is configured to receive the voltage LX of the node $N_{LX}$ and a second reference voltage VRef2, and output a second logic signal accordingly. The second logic gate G4 is configured to receive the second logic signal and a second control signal C2 of the second switch T2, and output the second protecting signal L2 to the driving circuit 120 accordingly. For example, the second comparator G3 and the second logic gate G4 are configured to control logic circuits of the second switch T2. For preventing the state of FIG. 3 (such as the shorted state of the first switch T1) from damaging the second switch T2, the second reference voltage VRef2 is set at the high level. When the voltage LX of the node $N_{LX}$ is more than the second reference voltage VRef2 which is at the high level, the second logic signal outputted by the second comparator G3 is at the high level.

In this embodiment, the second switch T2 can be but not limited to the N-type Metal-Oxide-Semiconductor Field-Effect Transistor (MOSFET). In this case, the second control signal C2 of the second switch T2 is at the high level and to turn on the second switch T2. In case the first switch T1 is shorted, the second logic gate G4 outputs the second protecting signal L2 which is at the high level to the driving circuit 120 according to the second logic signal which is at the high level and the second control signal C2 which is at the high level. When the driving circuit 120 receives the second protecting signal L2 which is that the high level, the driving circuit 120 will turn off the second switch T2.

As shown in FIG. 4, the protecting circuit 110 further comprises a second retarder 114. The second retarder 114 is coupled to the second comparator G3, and configured to receive the voltage LX of the node $N_{Lx}$ and to provide the voltage LX of the node $N_{LX}$ to the second comparator G3. It should be noted that, the function of the second retarder 114 is described above and is configured to prevent from mistaken movement, and the tautology is eliminated herein. Circuit architectures are not limited to that shown in FIG. 4 of the present disclosure, that is, it is not limited to the AND gates, which are shown as exemplary embodiments, and other circuits or elements can be applied in the protecting circuit 110, other modifications can be also applied in the protecting circuit 110, such modifications will not departure from the spirit of the disclosure.

Figure 5:
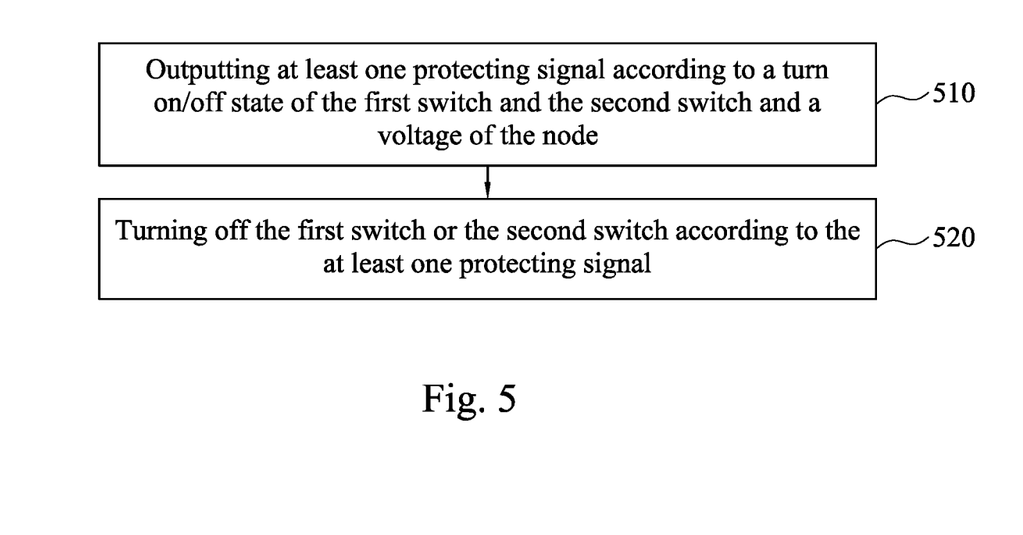
FIG. 5 is a flow diagram illustrating a control method according to some embodiments of the present disclosure.

FIG. 5 is a flow diagram illustrating a control method 500 according to some embodiments of the present disclosure. The control method 500 of FIG. 5 comprises the following operations:

Operation 510: outputting at least one protecting signal according to the turn on/off state of the first switch and the second switch and the voltage of the node; and Operating 520: turning off the first switch or the second switch according to the at least one protecting signal.

For easier understanding the control method 500 of FIG. 5, reference is made to incorporate with the FIG. 1. In operation 510, the at least one protecting signal outputted by the protecting circuit 110 according to the turn on/off state of the first switch T1 and the second switch T2 and the voltage LX of the node $N_{LX}$. In operation 520, the first switch T1 or the second switch T2 is turned off by the driving circuit 120 according to the at least one protecting signal.

In some embodiments, please refer to the operation 510, when the first switch T1 is in the turn on state and the voltage LX of the node $N_{LX}$ is at the low level, the first protecting signal L1 is outputted by the protecting circuit 110. Then, please refer to operation 520, the first switch T1 is turned off by the driving circuit 120 according to the first protecting signal.

In the other embodiments, please refer to the operation 510, when the second switch T2 is in the turn on state and the voltage LX of the node $N_{LX}$ is at the high level, the second protecting signal L2 is outputted. Then, please refer to the operation 520, the second switch T2 is turned off by the driving circuit 120 according to the second protecting signal L2.

According to the above-mentioned statements, the present disclosure provides the following merits. The regulator device and the control method do not need the additional detecting elements, such that the cost can be decreased and the area of the regulator device can be smaller because of the reduction of the detecting elements. In addition, the regulator device and the control method make the switches turn off quickly in response to the regulator device satisfying conditions, such that the overall operating speed is increased.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:
1. A regulator device, comprising:
    a first switch configured to receive a power supply voltage;

a second switch, wherein one terminal of the second switch and the first switch are coupled at a node, and the other terminal of the second switch is coupled to a ground terminal;

a protecting circuit coupled to the node, wherein the protecting circuit is configured to output at least one protecting signal according to a turn on/off state of the first switch and the second switch and a voltage of the node; and a driving circuit coupled to the first switch, the second switch, and the protecting circuit, wherein the driving circuit is configured to turn off the first switch or the second switch according to the at least one protecting signal;

wherein when the first switch is in the turn on state, the second switch is shorted, and the voltage of the node is at a low level, the protecting circuit outputs a first protecting signal to the driving circuit such that the driving circuit turns off the first switch according to the first protecting signal.

2. The regulator device of claim 1, wherein when the voltage of the node is at the low level having been maintained for a first delay time, the protecting circuit outputs the first protecting signal to the driving circuit.

3. The regulator device of claim 2, wherein when the second switch is in the turn on state and the voltage of the node is at a high level, the protecting circuit outputs a second protecting signal to the driving circuit, and the driving circuit turns off the second switch according to the second protecting signal.

4. The regulator device of claim 3, wherein when the second switch is in the turn on state and the first switch is shorted, the voltage of the node is at the high level, and the protecting circuit outputs the second protecting signal to the driving circuit.

5. The regulator device of claim 4, wherein when the voltage of the node is at the high level and has been maintained for a second delay time, the protecting circuit outputs the second protecting signal to the driving circuit.

6. The regulator device of claim 1, wherein the first switch comprises:
a firs terminal configured to receive the power supply voltage;
a control terminal coupled to the driving circuit; and
a second terminal;
wherein the second switch comprises:
a first terminal coupled to the first switch at the node;
a control terminal coupled to the driving circuit; and
a second terminal coupled to the ground terminal.

7. The regulator device of claim 6, further comprising:
an inductance comprising:
a first terminal coupled to the node; and
a second terminal; and
a capacitance comprising:
a first terminal coupled to the second terminal of the inductance; and
a second terminal coupled to the ground terminal.

8. The regulator device of claim 1, wherein the protecting circuit comprises:
a first comparator configured to receive the voltage of the node and a first reference voltage of the node, and to output a first logic signal; and
a first logic gate configured to receive the first logic signal and a first control signal of the first switch, and to output the first protecting signal.

9. The regulator device of claim 8, wherein the protecting circuit further comprises:
a first retarder, coupled to the first comparator, configured to receive the voltage of the node, and to provide the voltage of the node to the first comparator.

10. The regulator device of claim 9, wherein the first reference voltage is at the low level, and when the voltage of the node is at the low level, the first comparator outputs the first logic signal which is at the low level according to the voltage of the node which is at the low level and the first reference voltage, wherein the first control signal is at the low level, and the first logic gate outputs the first protecting signal according to the first logic signal which is at the low level and the first control signal.

11. The regulator device of claim 10, wherein the protecting circuit further comprises:
a second comparator configured to receive the voltage of the node and a second reference voltage, and to output a second logic signal accordingly; and
a second logic gate configured to receive the second logic signal and a second control signal of the second switch, and to output the second protecting signal accordingly.

12. The regulator device of claim 11, wherein the protecting circuit further comprises:
a second retarder, coupled to the second comparator, configured to receive the voltage of the node, and to provide the voltage of the node to the second comparator.

13. The regulator device of claim 10, wherein the second reference voltage is at the high level, and when the voltage of the node is at the high level, the second comparator outputs the second logic signal which is at the high level according to the voltage of the node which is at the high level and the second reference voltage, wherein the second control signal is at the high level, and the second logic gate outputs the second protecting signal according to the second logic signal which is at the high level and the second control signal.

14. A control method of controlling a regulator device, wherein the regulator device comprises a first switch and a second switch, and one terminal of the first switch is configured to receive a power supply voltage, one terminal of the second switch and the first switch are coupled at a node, and the other terminal of the second switch is coupled to a ground terminal, wherein the control method comprises:
outputting at least one protecting signal according to a turn on/off state of the first switch and the second switch and a voltage of the node; and
turning off the first switch or the second switch according to the at least one protecting signal;
wherein outputting the at least one protecting signal according to the turn on/off state of the first switch and the second switch and the voltage of the node comprises:
outputting a first protecting signal while the first switch being in the turn on state, the second switch being shorted, and the voltage of the node being at a low level; and
turning off the first switch according to the first protecting signal.

15. The control method of claim 14, wherein outputting the at least one protecting signal according to the turn on/off state of the first switch and the second switch and a voltage of the node comprises:
outputting a second protecting signal while the second switch being in the turn on state and the voltage of the node being at a high level.

16. The control method of claim 15, wherein turning off the first switch or the second switch according to the at least one protecting signal comprises:

turning off the second switch according to the second protecting signal.

* * * * *